W. H. FAUBER.
HYDROPLANE BOAT.
APPLICATION FILED NOV. 25, 1912.
1,121,006.
Patented Dec. 15, 1914.
6 SHEETS—SHEET 1.
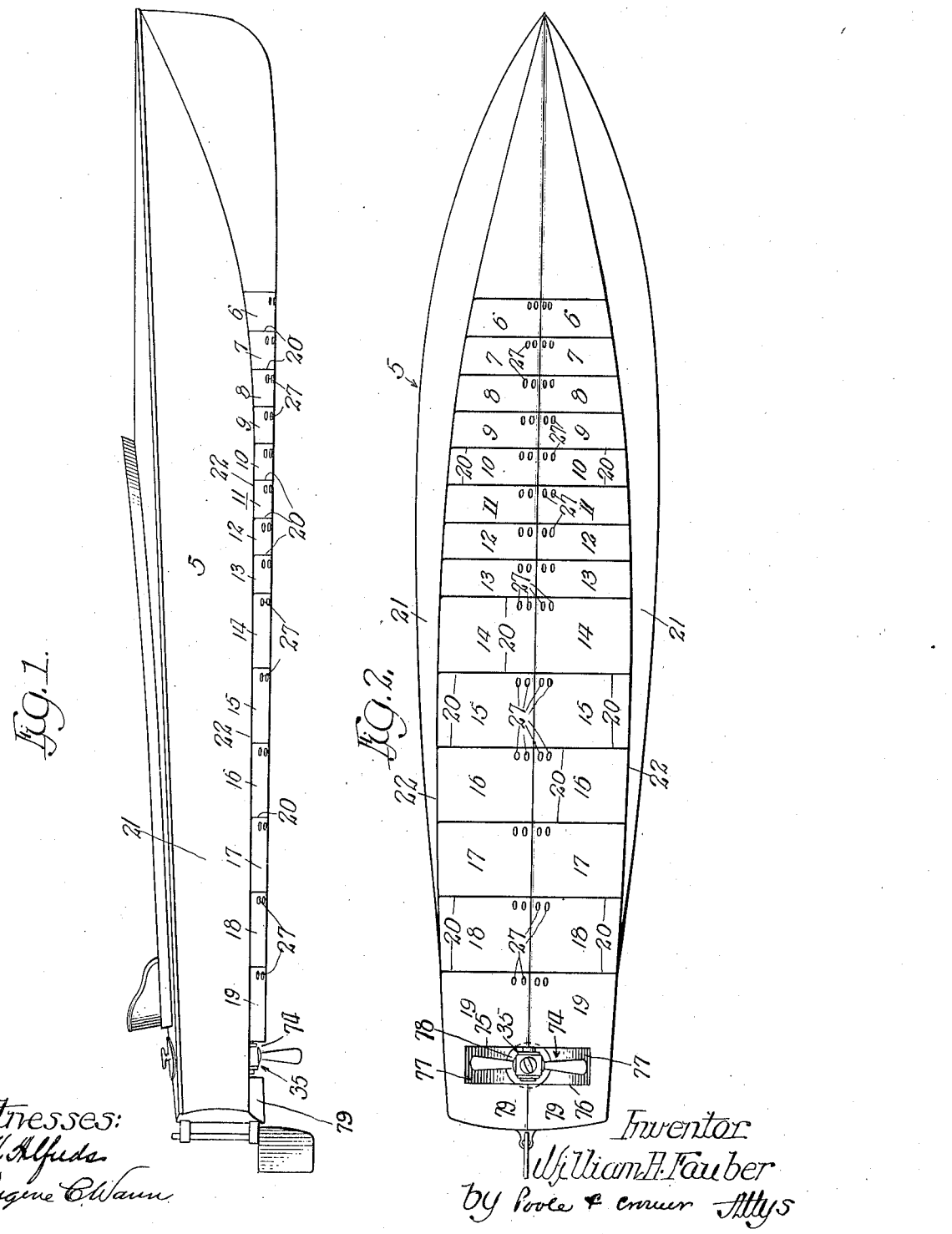

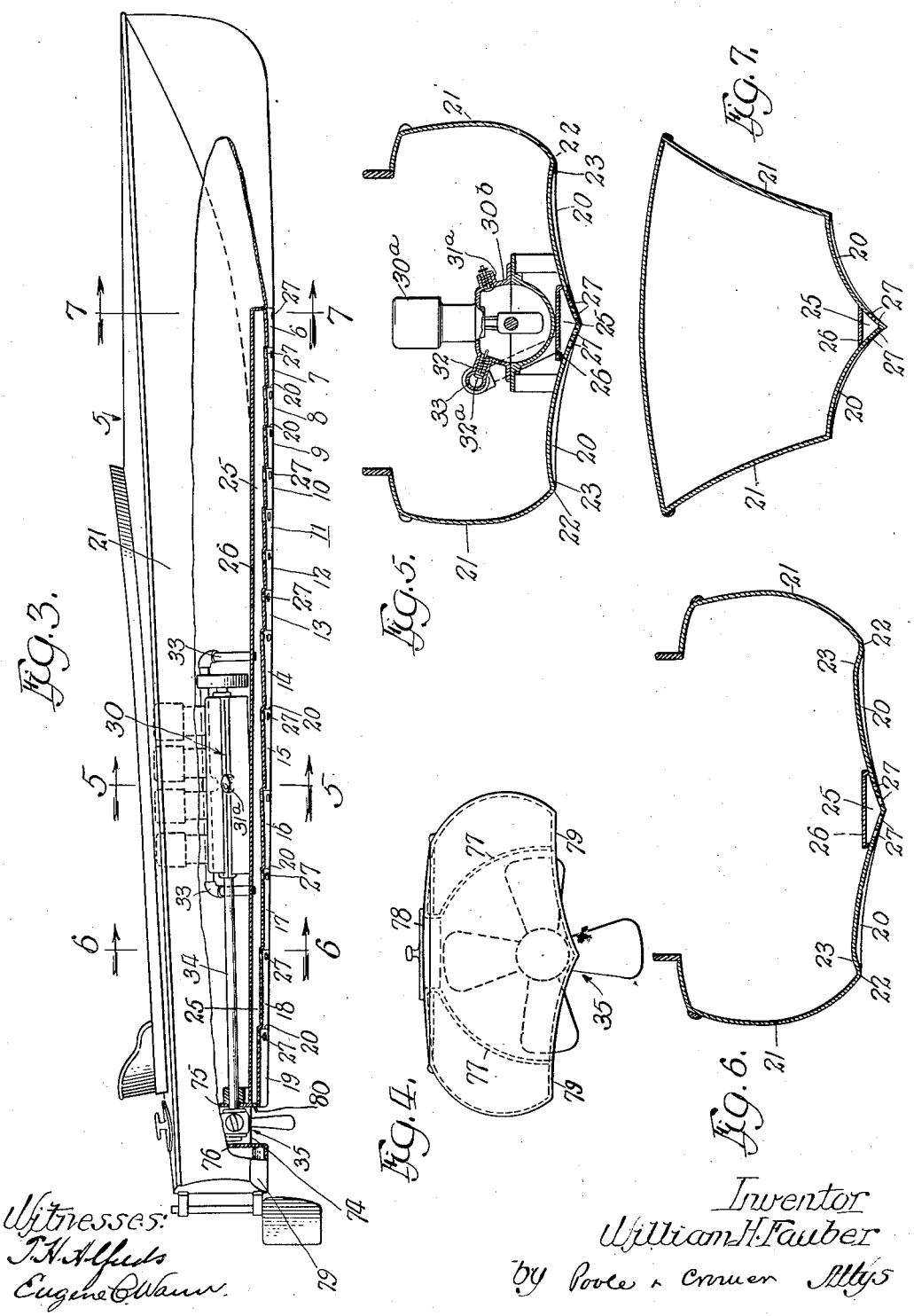

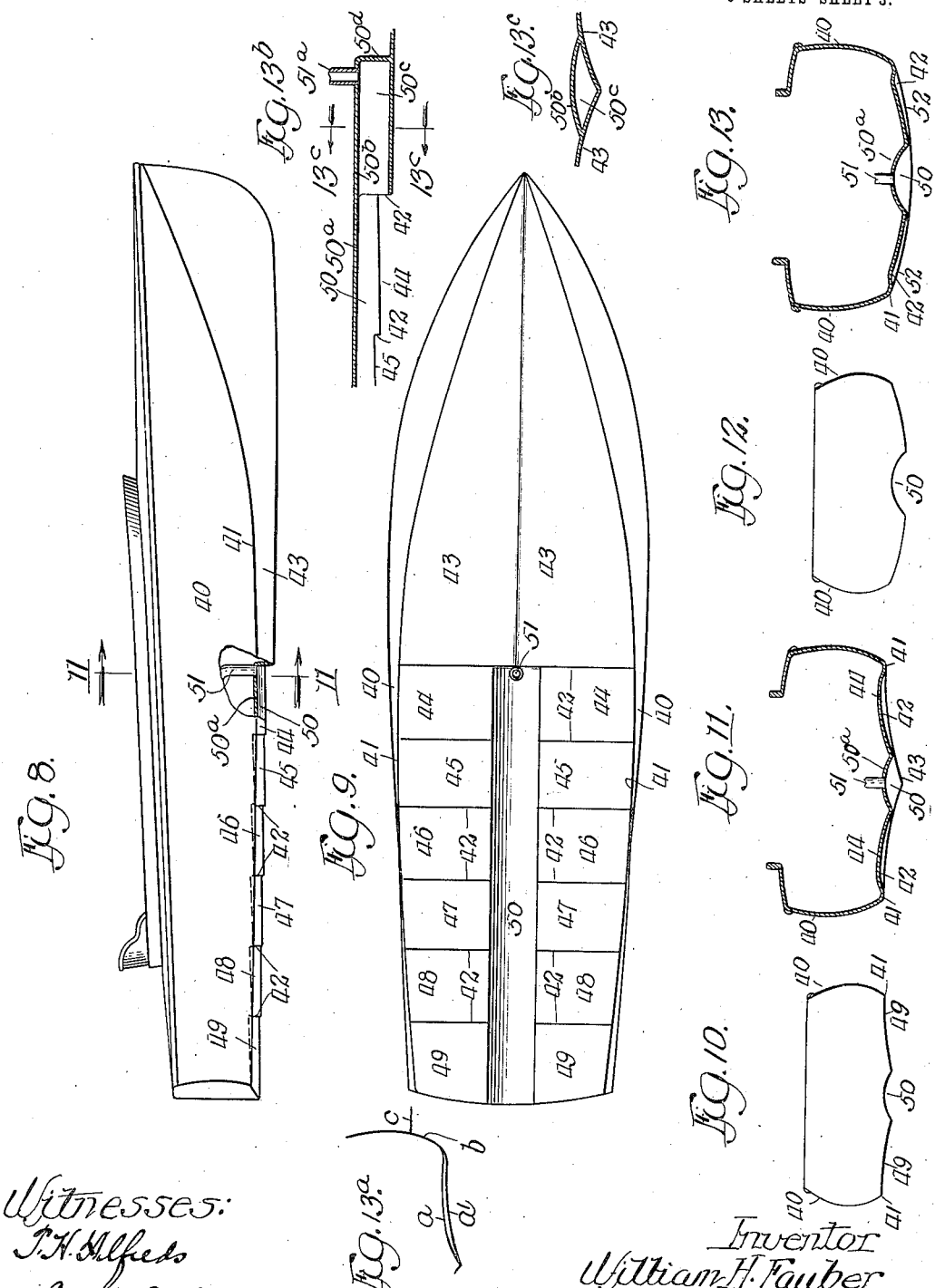

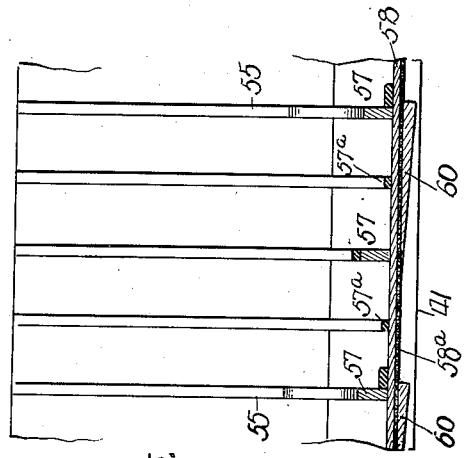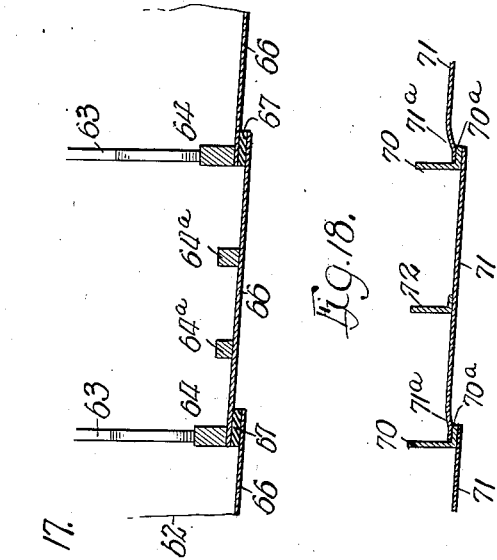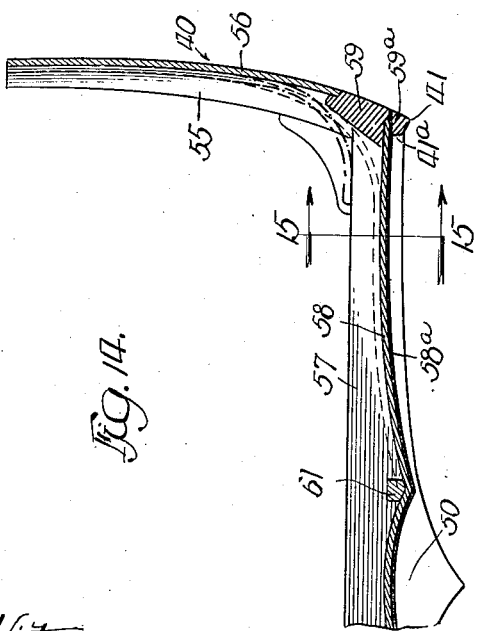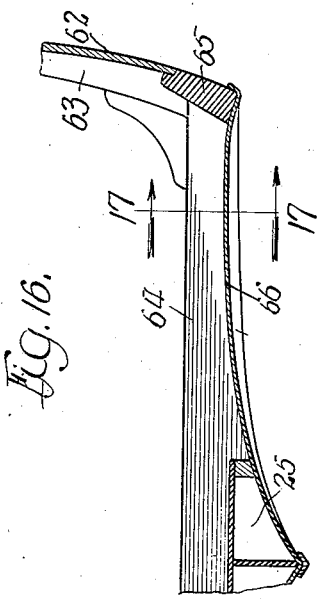

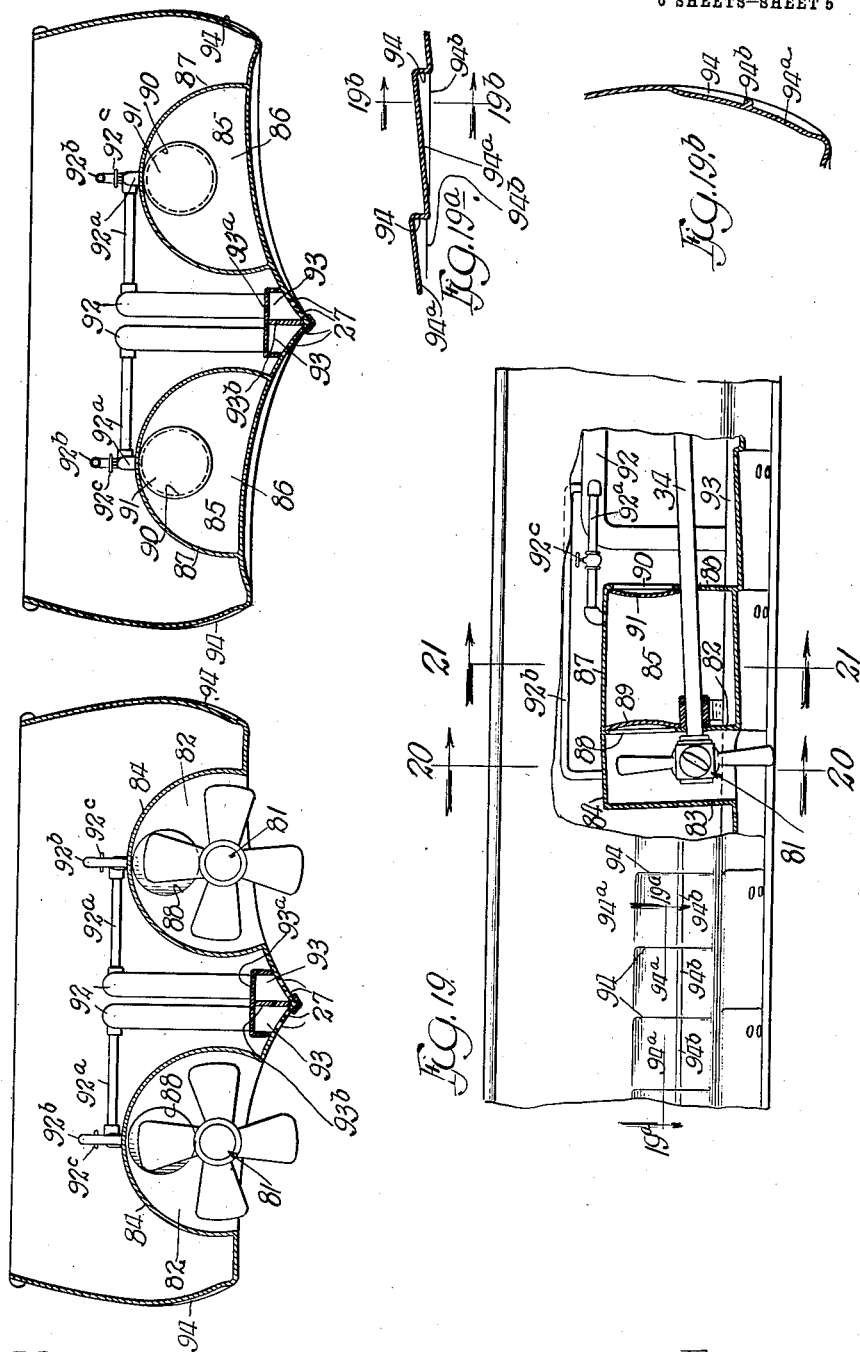

W. H. FAUBER.
HYDROPLANE BOAT.
APPLICATION FILED NOV. 25, 1912.

1,121,006.

Patented Dec. 15, 1914.
6 SHEETS—SHEET 6.

UNITED STATES PATENT OFFICE.

WILLIAM H. FAUBER, OF CHICAGO, ILLINOIS.

HYDROPLANE-BOAT.

1,121,006.  Specification of Letters Patent.  Patented Dec. 15, 1914.

Application filed November 25, 1912. Serial No. 733,240.

*To all whom it may concern:*

Be it known that I, WILLIAM H. FAUBER, a citizen of the United States, and a resident of Chicago, in the county of Cook and State of Illinois, have invented certain new and useful Improvements in Hydroplane-Boats; and I do hereby declare that the following is a full, clear, and exact description thereof, reference being had to the accompanying drawings, and to the letters of reference marked thereon, which form a part of this specification.

This invention relates to improvements in that class of water craft, known as "hydroplane" boats, which are equipped with inclined surfaces or planes designed to act on the water when the boat is traveling at high speed in a manner to lift the boat and lessen the submerged area of the hull thereof, with consequent reduction of wave making and skin resistance and the attainment of high speed in proportion to the propelling power employed.

My present invention embodies various improvements in hydroplane boats of the general character above stated, and also to certain improvements in the class or type of such hydroplane boats shown in my prior Letters Patent No. 971,029, dated September 27, 1910, and No. 1,024,682, dated April 13, 1912.

Among the objects of the invention are to provide an improved construction in the form of the hydroplane surfaces or planes of such boats adapted to confine air under pressure between the planes and the water, thereby reducing the area of the hull subject to frictional contact with the water, to provide for the introduction of air and gases under pressure beneath the hydroplane surfaces, and to otherwise improve the construction of such boats, as will be made apparent by the following description of forms of hydroplane boats embodying the several features of my invention.

The invention consists in the matters hereinafter set forth and pointed out in the appended claims.

My invention may be more readily understood by reference to the accompanying drawings, in which—

Figure 22:
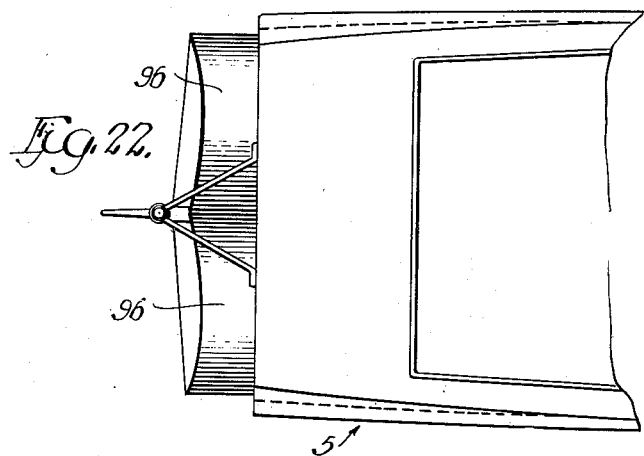
Figure 23:
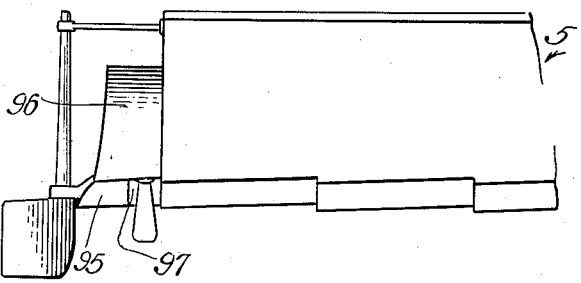
Figure 24:
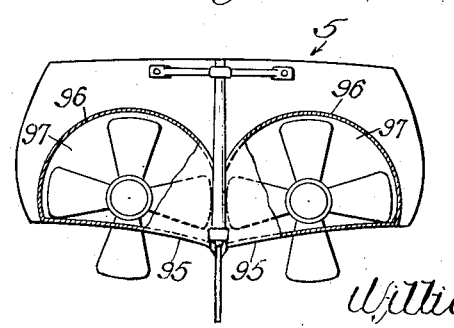

Figure 1 is a view in side elevation of the hull of a hydroplane boat embodying some of the principal features of my invention; Fig. 2 is a view, as seen from beneath, of the hull of the boat shown in Fig. 1; Fig. 3 is a view in side elevation of the boat shown in Figs. 1 and 2, with parts broken away to show parts of the hull of the boat in longitudinal section, and the propelling means in side elevation; Fig. 4 is a view in elevation of the stern of the boat shown in Figs. 1 to 3; Fig. 5 is a cross section of the same, taken on line 5—5 of Fig. 3; Fig. 6 is a view in cross section taken on line 6—6 of Fig. 3; Fig. 7 is a view in cross section taken on line 7—7 of Fig. 3; Fig. 8 is a view in side elevation of the hull of a boat, shown with a somewhat different form of construction therein, with parts in section; Fig. 9 is a view, as seen from beneath, of the hull of the boat shown in Fig. 8; Fig. 10 is a view in elevation of the stern of the boat shown in Fig. 8; Fig. 11 is a cross section, taken on line 11—11 of Fig. 8; Fig. 12 is a view showing a modified form of the stern of the boat shown in Fig. 8; Fig. 13 is a view in cross section corresponding to Fig. 11, showing a modified cross-sectional form of the hydroplane surfaces illustrated in Fig. 8; Fig. 13$^a$ is a diagrammatic view, showing a modified form of the hydroplane surfaces; Fig. 13$^b$ is a detail, longitudinal section, showing a modified form of the means for supplying air under pressure to the longitudinal channel shown in Figs. 8 to 13; Fig. 13$^c$ is a cross section, taken on line 13$^c$—13$^c$ of Fig. 13$^b$; Fig. 14 is an enlarged cross sectional view showing details of construction in the hull of a boat made as shown in Figs. 8 to 11; Fig. 15 is a detail section, taken on line 15—15 of Fig. 14; Fig. 16 is an enlarged section showing details of construction in the hull of a boat made as shown in Figs. 1 to 7; Fig. 17 is a detail, longitudinal section taken on line 17—17 of Fig. 16; Fig. 18 is a detail, longitudinal section corresponding with Fig. 17, showing a modification of the details of construction in the parts forming the hydroplanes; Fig. 19 is a view partly in elevation and partly in longitudinal section of a boat corresponding in form with that shown in Figs. 1 to 7, equipped with two propellers located at a point between the bow and the stern of the boat; Fig. 19$^a$ is a horizontal, detail section of the side wall of the hull, taken on line 19$^a$—19$^a$ of Fig. 19; Fig. 19$^b$ is a detail, vertical section, taken on line 19$^b$—19$^b$ of Fig. 19$^a$; Fig. 20 is a view in cross section taken upon line 20—20 of Fig. 19; Fig. 21 is a view in cross section taken upon line 21—21 of Fig. 19; Fig. 22 is a plan view of the stern portion of a boat, corresponding with that shown in Figs. 1 to 7, but equipped with two propellers located at the rear of the hull of the boat; Fig. 23 is a view in side elevation of the stern portion of the boat shown in Fig. 2; Fig. 24 is a view in elevation of the stern of the boat shown in Figs. 22 and 23.

Referring first to the form of boat shown in Figs. 1 to 7, the hull 5 of the boat, as illustrated, is generally similar in shape to the hull of boats as at present constructed, having a long, pointed bow with its greatest width at a point about midway of its length and from such point tapering forward to the bow and rearward to the stern. The bottom of the hull 5 is provided, at each side of the central or keel line thereof, with a plurality of hydroplane members 6, 7, 8, 9, 10, 11, 12, 13, 14, 15, 16, 17, 18 and 19, each of which is downwardly inclined from front to rear and is also, inclined from the side margin of the hull downwardly to the said central or keel line, so as to give, in general, to the bottom of the hull, a V-shape in cross section. The rear margin of each of said hydroplane members is joined to the forward margin of the one to the rear of it by a vertical shoulder or wall 20 extending transversely of the hull. The side margin of said hydroplane members extend to the lower margins of the side walls 21, 21 of the hull, which latter terminate at their lower edges at bilge lines 22, 22 which extend from the bow to the stern and each of which, at the forward portion of the boat, is carried upward in a gradual curve to a point near the top of the hull at the bow. Each of the hydroplane members 6 to 19 is not only inclined in a lateral direction from the bilge line 22 downwardly to the keel line, but is also made of transversely concaved form, as set forth in said prior Patent No. 971,029. The forward portion of the hull, forward of the front hydroplane member 6 and below the upwardly curved bilge line 22, 22, is made, generally, of V-shape and of concaved form; the curved surface thereof adjacent to the forward hydroplane member 6, as shown in Fig. 7, merging gradually into the vertical lateral surfaces at the bow or cut-water of the hull. The construction of the bottom of the boat, made according to the present invention, differs from that shown in said prior patent, by reason of the fact that several hydroplane surfaces do not, in this case, extend to or meet the outer surfaces of the side walls 5, 5 of the hull, but the lower margins of said side walls at the bilge lines 22, 22 are continuous and substantially in line with or somewhat below the lower, rear, transverse margins of the several hydroplane surfaces; the upper forward margins of said hydroplane surfaces being elevated above the level of the lower edges of the side walls of the hull, indicated by said bilge lines 22, 22. In the particular construction of this feature shown in the sectional views, Figs. 5 and 6, the transversely inclined hydroplane surfaces, are at their forward or elevated margins, curved or deflected downwardly to meet the side walls of the hull at the bilge lines 22, 22, thereby forming short downwardly and outwardly inclined parts or sections 23, 23 which, by reason of the fact that their outer margins conform to the bilge lines and their inner margins merge into the inclined hydroplane surfaces, are of warped or twisted form. It is not, however, in the carrying out of this feature of my invention, necessary that the outer, lateral, marginal parts of the several hydroplane surfaces should be so outwardly and downwardly inclined, for the reason that the hull may have adjacent to and inside of the bilge line 22, a substantially vertical or abrupt shoulder, as indicated by 41$^a$ in the modified construction shown in Fig. 14. In the construction shown in said Figs. 1 to 7, provision is made for delivery of air or gases under pressure beneath the several hydroplane members at points adjacent to the keel line, as follows: As clearly seen in Figs. 3, 5 and 6, a longitudinal passage or air duct 25 is formed in the interior of the hull along and adjacent to the keel line by means of a transversely extending horizontal wall 26, joined at its side margins to the bottom wall of the hull at either side of the keel line. The portion of the bottom wall constituting each hydroplane member is provided with a plurality of openings or apertures 27, 27, through which air may pass from the air duct 25 to the spaces at the rear of the steps or shoulders; air being delivered under pressure to said air duct 25 so that it is forced through said openings under a pressure sufficient to overcome the upward pressure of the water beneath the boat.

Air or gases under pressure may be delivered to the air duct or passage 25 by any convenient form of air forcing or pumping device, but, as shown in the accompanying drawings (Figs. 3 and 5), the propelling means for the boat include an internal combustion engine 30, having a closed crank case for each cylinder, and so arranged that the pistons of the several cylinders, which open into said crank case, operate as pumps to force air into said passage. As shown in sectional view in Fig. 5, 30$^a$ is one of the cylinders of the engine and 30$^b$ the crank case associated with such cylinder. Said crank case is provided with an inwardly opening check valve 31$^a$ and with an air outlet passage 32 provided with an outwardly opening check valve 32ª. The several outlet passages 32 are connected with a longitudinally extending air pipe 33 which, at both of its ends, is directed downwardly and connected with the wall 26 of the air duct 25. In the reciprocatory movement of the piston in each cylinder, air is drawn into the compartment of the crank case 30ᵇ, associated with such cylinder, and in the outward or downward movement of said piston the air is forced from the crank case, under pressure, to the said air duct 25.

As shown in Figs. 1 to 4, the engine 30 operates to drive a propeller shaft 34 having on its rear end a propeller 35, which is located in a downwardly opening chamber or well near the stern of the boat, and which has its hub located above the level of the water in which the propeller blades act.

The form of boat shown in Figs. 8 to 11 of the accompanying drawings, embodies the same general features of construction in the hydroplane members hereinbefore described. In this instance, however, the hull of the boat embodies certain special features of construction as follows: The side walls 40 of the hull terminate at their lower margins in continuous bilge lines 41, as hereinbefore described. At a point about midway of the length of the hull, its bottom surface, between the bilge lines, is provided with transverse rearwardly facing shoulders 42. Forward of said shoulders the bottom of the hull is provided with hydroplane surfaces 43, 43, which have a lateral, downward inclination from said bilge line to the keel line and are transversely concave, as clearly seen in Fig. 11. Said concave hydroplane surfaces 43 are gradually increased in lateral inclination toward the bow of the boat and finally merge into the lateral, upright surfaces of the stem or cut-water. Rearward of the transverse shoulders 42 the bottom of the hull is provided at each side of the central keel line with a plurality of hydroplane surfaces 44, 45, 46, 47, 48 and 49, which are constructed in the same manner as the hydroplane surfaces shown in Figs. 1 to 7. In this instance, however, the inner lateral margins of said hydroplane surfaces are separated from each other by considerable space, and the hull at the keel line is provided with a longitudinal, downwardly facing concave recess or channel 50, which may conveniently be formed by giving a concave shape to the central part 50ª of the bottom wall of the hull, as clearly seen in Figs. 10 and 11. A pipe 51 to which air is delivered under pressure from any suitable air-forcing device is connected with the forward end of said channel 50 and is adapted to deliver air under pressure thereto. The air thus delivered to said channel 50 passes from the sides of the same to the inner ends of the lateral channels formed by the hydroplane surfaces 44 to 49 and is held or confined therein in the same manner as before described in connection with Figs. 1 to 7. It follows from the above that the said channel 50 operates generally in the same manner as the longitudinal air duct 25, shown in Figs. 1 to 7, in distributing air to the several hydroplane surfaces.

Figs. 12 and 13 show a construction generally like that illustrated in Figs. 8 to 11, the difference being that, in this instance, the several laterally inclined hydroplane surfaces, one of which is indicated by 52 in Fig. 13, are made of convex instead of concave form.

The features of construction in the hull of the boat hereinbefore described and shown in Figs. 5, 6, 8, 9, 11 and 13, as well as in Fig. 14, wherein the formation of the hull is such as to afford continuous bilge lines, coinciding with or extending below the lower or rear transverse margins of the hydroplane sections and which are normally below the water line, have the advantage of enabling the hull of the boat to be more strongly and easily constructed because the hull at or along such bilge lines may consist of continuous longitudinal members, instead of being of broken or zigzag form, as in the case of the construction illustrated in my said prior patents, wherein the hydroplane surfaces extend to and intersect the outer surfaces of the side walls of the hull.

When the boat is provided with means for delivering air or gases under pressure behind the several steps or shoulders as hereinbefore described, the features of construction shown in said Figs. 5, 6, 8, 9, 11, 13 and 14, has special advantages by reason of the fact that the longitudinally continuous portions of the hull at the bilge lines, serve to prevent the escape, at the outer lateral margins of the hydroplane surfaces, of the air or gases so delivered under pressure. In this respect the construction illustrated differs from that of my said prior patent wherein, by reason of the fact that the hydroplane surfaces intersect the outer surfaces of the side walls of the hull, openings are afforded, when the boat is at speed, through which air may escape between the outer lateral margins of the hydroplane surfaces and the surface of the water. Moreover, when the formation of the hull is such as to constitute continuous bilge lines coinciding with or extending below the lower or rearmost transverse edges of the hydroplane sections, at the outer side margins of the latter, in connection with hydroplane surfaces which are inclined from the bilge lines downwardly and inwardly to the center or keel line of the hull, so as to make the bottom of the hull substantially of V-shape in cross section, and further important advantage is gained that in any lateral or rolling movement of the boat, to an extent sufficient to lift one side of the hull at the bilge line above the surface of the water, the air supplied under pressure at the rear of the steps will escape therefrom only at the side of the hull which is so lifted, while any escape of such air at the opposite or depressed side of the hull will be prevented; the escape of air from beneath the hydroplane surfaces at the depressed side of the boat at such time being prevented by the presence of the continuous keel line at the inner margin, and the continuous bilge line at the outer margins, of the hydroplane members.

The air delivered from the air forcing means through the air-duct 25 and openings 27 to the inner margins of the hydroplane members, as shown in Figs. 1 to 6, or so delivered through the channel 50 of Figs. 8 to 13, to the inner margins of such hydroplane members, tends to move or flow in an outward or lateral direction, along the spaces at the rear of the steps or shoulders, and is therein held or confined by reason of the fact that the hull at the bilge line is constantly immersed, and the air is thereby prevented from escaping at the said bilge line.

It is to be understood that, by reason of the rapid forward movement of the boat when under speed, the surface of the water beneath the several hydroplane surfaces is formed or molded to correspond with the cross-sectional shape of the hull, and that, in the case of any two adjacent hydroplane surfaces, by reason of such rapid movement, the water over which the rear edge of the forward hydroplane surface has passed, is not given time to rise into and fill the entire space beneath the rear hydroplane surface, but strikes such rear hydroplane surface at some distance rearwardly from the shoulder at the forward margin of the same. When the boat is at speed, therefore, open spaces are left or formed behind the transverse shoulders, even when no air is forced beneath the hydroplane surfaces. When air is delivered under pressure beneath the hydroplane members, and is there confined, as described, the pressure of such air on the surface of the water retards the rising of the same, so that in the rapid forward movement of the hydroplane members, said open spaces are largely increased in area and the rear marginal parts only of the hydroplane members come in contact with the water. It follows that air delivered under pressure to the lower surface of the hydroplane members acts to exert a downward pressure on the water over which the hydroplanes are passing, and, if the pressure of the air so introduced be not less than the upward pressure of the water on the air so delivered, the boat will be partially supported by the downward pressure, on the surface of the water, of the bodies of air introduced and confined beneath the hydroplane members, so that the water will come in frictional contact with the hydroplane members only in a small portion of their area, adjacent to their rear edges. Manifestly, when air is thus introduced and confined beneath the hydroplane surfaces, the frictional resistance of the forward movement of the boat, due to the contact of the hydroplanes with the water, will be reduced to an extent corresponding with the area of the surface of the water which is subject to air pressure, as compared with the area of the hydroplane surface which is in contact with the water.

From the above, it follows that the construction described, by which air delivered under pressure beneath the hydroplane surfaces is there held or confined, frictional resistance is largely lessened and the speed of the boat, with a given propulsive power, is correspondingly augmented. It is to be further observed, in this connection, that in the rapid forward movement of the boat air spaces will be formed at the rear of each transverse shoulder and beneath the forward part of the hydroplane surface at the rear of such shoulder, regardless of the degree of transverse inclination of the hydroplane surface, and that the effect of the air pressure beneath the hydroplane members, in lessening the area of frictional contact between the hydroplane members and the water, will therefore be obtained to substantially the same extent at the portions of the hydroplane members, that have a considerable lateral inclination, as at the parts thereof having little or no lateral inclination. From the above it follows that the desired result of preventing the escape of air at the outer lateral margins of the hydroplane members, or at the bilge lines, will be secured if the hydroplane members are arranged to terminate at their outer, lateral edges below continuous, longitudinal surfaces of the sides of the hull that are constantly immersed, or are below the level of the water when the boat is at speed, so that no openings for the escape of air will be present at such outer margins of the hydroplane members. This will be better understood by the diagrammatic view, Fig. 13$^a$, wherein the lines $a$, $a'$ indicate the cross-sectional forms of the higher and lower, or front and rear, margins of one of the hydroplane members, $b$ indicates a longitudinally continuous portion of the side of the hull, and $c$ indicates the normal water level, with respect to the hull, when the boat is at speed. The bilge of the hull in this instance is convex or rounded and the hydroplane surfaces are merged into the surface of the hull at a line located below the continuous longitudinal surface $b$ and also below the water line $c$. In a construction of the hull and hydroplane surfaces, as is indicated by said diagram, the outer ends of the transversely extending air space formed beneath each hydroplane member, will be closed, so as to prevent the escape of air introduced beneath the hydroplane members, in the same manner as in the case of the forms of construction shown in Figs. 1, 5, 6, 8, 11, 13 and 14, it being obvious that, by reason of the rapid forward movement of the boat, air spaces will be formed behind each step or shoulder; that the compressed air beneath the hydroplane members will be prevented from escaping at such outer margins by reason of the pressure of the water there exerted, and that air delivered under pressure to such spaces will act to lessen the area of the hydroplane members in contact with the surface of the water. The downward extension of the side surfaces of the hull below the level of the highest part of the hydroplane members, shown in Figs. 5 and 6 and also in Fig. 14, as a means of preventing the escape of air from beneath the said hydroplane members, is preferred, because by this construction, liability of such escape, when there is a lateral rolling movement of the boat, or in rough water, is lessened, but the general result desired will be obtained to a practicable degree by the construction of Fig. 13$^a$.

In Figs. 13$^b$ and 13$^c$ are shown a somewhat different construction in means for admitting air to the forward end of the air channel 50, shown in Figs. 8 to 13, wherein the part 50$^a$ of the bottom of the hull, which is transversely curved to form said channel 50, is carried forward of the shoulder 42 in the form of a partition, as indicated at 50$^b$, thereby forming a longitudinal air duct 50$^c$ that is closed at its forward end by an end wall 50$^d$. In this instance, the air duct 50$^c$ opens rearwardly through the shoulder 42 by means of an opening corresponding with the cross-sectional form of said air duct 50$^c$. An air supply pipe 51$^a$ is shown as connected with the forward end of the air duct 50$^c$, the same being adapted to receive air under pressure from any suitable form of air forcing device.

The features of construction shown in Figs. 8 to 13 and in Fig. 13$^b$, whereby a longitudinal channel 50, supplied with air under pressure at its forward end, is employed for the purpose of delivering air behind the steps or shoulders at opposite sides of said channel, has an important advantage, as compared with the construction shown in Fig. 3, wherein air is delivered to the several hydroplane members by an interior, longitudinal air duct, for reasons as follows: When the hydroplane members are inclined downwardly and inwardly and terminate at a central longitudinal projection or keel at the center line of the hull, the hull of the boat along said keel line will be in frictional contact with the water substantially throughout its length, as will be plainly seen from Figs. 1 to 7 of the drawings. When, however, a longitudinal channel, as indicated at 50 in Figs. 8 to 13, is employed, the pressure of air introduced into the forward end of said channel will act to prevent the water from rising into said channel through the principal part of its length and the top wall of the channel will be free from frictional contact with the water, except at the rear part of the same. The total surface of the bottom of the boat in frictional contact with the water will, therefore, be greatly reduced in area, as compared with the construction shown in Figs. 1 to 7, with corresponding decrease in the frictional resistance to be overcome by the engine or motor in propelling the boat, and corresponding advantage in point of speed gained in proportion to the propelling power employed.

Figs. 14 and 15 illustrate details of construction that may be used to advantage in the formation of the hydroplane surfaces on a boat made as shown in Figs. 8 to 11. In this instance the side walls of the hull are formed by means of vertically extending ribs 55 to which is attached the longitudinally extending outer skin 56 of thin wood or like material. The bottom wall of the hull is provided with main transverse, horizontal ribs or frame members 57, to which is secured a continuous longitudinal skin or layer 58 of wood or other thin material. Between said ribs 57, intermediate ribs 57$^a$ may be employed to afford additional support to the bottom. A continuous longitudinal bilge member 59 extends along the bilge line of the boat and is attached to the ribs 55 and 57; the layers 56 and 58 having their margins attached to the top and bottom of said strip. A separate strip 59$^a$ is attached to the lower face of the member 59; the lower edge of said strip forming the bilge line 41. The separate hydroplane surfaces are, in this instance, formed by means of separately applied, transversely extending tapered pieces or sections 60 of wood or like material which are made of such thickness at their rear margins as is required to give the desired downward and rearward inclination to the hydroplane surfaces. At their lateral outer margins said strips 60 meet or abut against the inwardly facing shoulder 41$^a$ formed on the longitudinal strip 59$^a$. Secured to the lower surface of the bottom layer or skin 58, 58 and between the same and the several tapered hydroplane sections 60, is a layer 58$^a$ of cloth or waterproof fabric which serves, when the continuous layer or skin 58 is of thin material, to strengthen the same and avoid liability of leakage.

The details of construction shown in said Figs. 14 and 15 may be applied either to the form of hull shown in Figs. 1 to 7 or to that shown in Figs. 8 to 13, but the sectional view, Fig. 14, shows a form of the bottom wall of the hull, corresponding with Fig. 11, and which embraces longitudinal frame members 61, which are secured to the transverse members 57 and serve to support the bottom skin or layer 58 along the angles between the laterally disposed hydroplanes and the concave portion of the bottom wall forming the channel 50. The said tapered strips 60 are shown as made narrower, in a direction lengthwise of the hull than the distance between the rearwardly facing shoulders or steps. As a result of this construction, the hydroplane surfaces are spaced from each other longitudinally of the boat, and the bottom of the hull has surfaces which are not inclined, intermediate of the forward edge of each hydroplane member and the rearwardly facing shoulder in advance of the same. This arrangement of the hydroplane surfaces, relatively to the steps or shoulders, may be used when the bottom of the hull is made otherwise than as shown in said Figs. 14 and 15, and has the advantage of enabling the bottom of the hull and the hydroplane surfaces thereon to be more cheaply and easily constructed without lessening the efficiency of the hydroplane surfaces, especially when bodies of air are maintained under pressure beneath the hull at the rear of each of the rearwardly facing shoulders, as hereinbefore described. This will be understood by consideration of the fact that by reason of the air spaces existing at the rear of each shoulder in the forward movement of the boat, and the fact that the area of such air spaces is materially increased by the introduction of air under pressure to such spaces, the water will come in contact with the hydroplane surfaces near the rear margins only of the same, and it is only necessary that the said hydroplane surfaces be of such dimension lengthwise of the boat as to insure that the water rising behind each of the shoulders will come in contact with the hydroplane surfaces at points rearward of their forward margins. In other words, the presence of flat or non-inclined surfaces on the hull at the rear of each shoulder will have no effect on the hydroplaning action, because the air spaces maintained beneath such non-inclined surfaces prevent the contact of the latter with the water.

In Figs. 16 and 17 are shown details of construction that may be desirably employed in the hull of a boat in which the hydroplane members are made of sheet metal. In this instance the outer skin 62 of the side of the hull is secured to upright side ribs 63, and the bottom of the hull embraces transverse ribs 64 which are secured at their ends to longitudinal frame or bilge member 65, to which the lower ends of the side ribs 63 are also attached. Each hydroplane member in this case consists of a piece of sheet metal 66 extending laterally from the keel line to the bilge member 65 and which, as shown in Fig. 16, is curved to give the desired concave cross-sectional form to the hydroplane member and at its outer end is inclined downwardly and secured to the lower margin of the said bilge member 65. The forward and rear margins of adjacent sheet metal hydroplane members 66, 66, are arranged in overlapping relation beneath the transverse frame member 64, and interposed therebetween are transverse wooden strips 67, the rear vertical margins of which form the shoulders between the hydroplane surfaces. As shown, the sheet metal hydroplane members 66 are additionally stiffened or supported by intermediate transverse ribs $64^a$, $64^a$, as seen in Fig. 17.

Fig. 18 shows in sectional view, a modification of the construction shown in Fig. 17, adapted for use in cases where the transverse ribs at the bottom of the hull are made of metal. In this instance, the main transverse ribs 70, 70 are provided with rearwardly bent, horizontal flanges $70^a$, $70^a$ at their lower margins. The plate 71, forming each hydroplane surface, is in this instance secured at its forward margin to the top of the flange $70^a$ there located and at its rear margin to the bottom of the like flange $70^a$. In this instance, in order to give sufficient depth to the shoulders between the hydroplane members, each plate 71 is bent or deflected downwardly at its forward margin, as indicated at $71^a$. As shown in said Fig. 18, an intermediate horizontal rib 72, of metal, flanged at its lower edge, is located between each pair of main ribs 70, 70.

The propeller 35, as illustrated in Figs. 1 to 4, is located in a chamber or well 74, formed in the hull at a distance forwardly from the stern of the boat, and opening downwardly through an opening in the bottom of the hull. The axis of rotation of the propeller is located above the level of the bottom of the hull, so that only the ends of the propeller blades project from the bottom opening of the well 74, and act in the water beneath the said opening. As shown, each chamber or well is formed by means of parallel transverse walls 75, 76, which are connected at their lower margins with the bottom wall of the hull at the rear of the rearmost hydroplane member 19, together with laterally curved walls 77, 77, generally concentric with the propeller shaft, which are likewise jointed at their lower margins to the bottom wall of the hull. The chamber formed by said walls is provided with an opening at its top, through which access may be had to the propeller. Said opening is closed by a removable cover 78, which has air tight connection with the surrounding wall of the chamber, in order to prevent the escape of air from said chamber. At the rear of the bottom opening of the chamber described, the bottom of the hull is provided with downwardly facing surfaces or planes 79, 79, which correspond generally in cross-sectional form with the rearmost hydroplane members 19, and are preferably inclined downwardly and rearwardly and arranged with their forward margins in longitudinal alinement with, but their rear margins somewhat below, the level of the rear edges of said hydroplane members 19, 19. At the sides of the propeller chamber 74, the bottom of the hull is made continuous with the surfaces of planes 19 and 76, as clearly seen in Fig. 2. The location of the propeller chamber 74 being at a distance forward from the stern of the boat and with its side margins inside of the side margins of the bottom of the hull, downwardly facing surfaces are formed on the bottom of the hull at the rear and sides of the opening of the well 74, through which the propeller blades downwardly project. Said downwardly facing surfaces serve to maintain a downward pressure on the surface of the water, which is displaced and molded to the form of the hull by the action of the hydroplane members in the forward movement of the hull of the boat, so that the water which is acted upon by the propeller blades is prevented from rising or being thrown upwardly at the sides or rear of the propeller. By the downward pressure of the hull of the boat on the surface of the water, at the sides and rear of the propeller, substantially the same conditions are maintained, as would be the case if the propeller were located entirely below the surface of the water, it being manifest that the propeller blades operate constantly in a substantially solid or undisturbed body of water, which is kept in that condition by the downward pressure on the same of the downwardly facing surfaces of the boat provided for that purpose.

In connection with the propeller, and well or chamber, arranged as described, I provide for delivering air under pressure to said well or chamber, in order to maintain a downward pressure on the surface of the water in the space at the bottom of the said chamber, and thus prevent the water from rising into the same to a level materially above that of the bottom surface of the hull. As shown in Fig. 3, provision is made for so delivering air under pressure to said propeller chamber, from the air duct 26, by means of the hole or holes 80, formed in the partition 75, to which the said channel 25 extends. By the provision of means for maintaining air pressure in the propeller well or chamber, in connection with the provision of downwardly facing surfaces on the hull of the boat at the sides and rear of said air chamber, the surface of the water beneath said chamber is maintained in the form to which it is shaped or molded by the action of the part of the hull in advance of the same. Moreover, the water in which the propeller blades act, being subject to the downward pressure of the downwardly facing surfaces of the boat at the sides and rear of the propeller chamber, and also subject to the pressure of air throughout the horizontal area of the propeller chamber, is maintained in a solid condition and thereby adapted to effectively resist the rearward thrust of the propeller blades, so that, in a boat made in accordance with this feature of my invention, loss of power is avoided, such as would result if the water were permitted to rise freely at the sides of, and behind, the propeller.

In Figs. 19 to 21 is shown a construction in a propeller well or chamber, adapted for use in a larger boat or ship equipped with two propellers. In this instance, the propellers are shown as arranged side by side at a point near the middle of the length of the boat, and each of the propellers, indicated by 81, is located in a downwardly opening well or chamber formed by means of transverse forward and rear walls 82, 83, and a curved wall 84 concentric with the propeller shaft. Forward of each propeller chamber, the hull of the boat is, in this instance, provided with a chamber 85 constituting an airlock. Said chamber 85 is shown as formed by means of a transverse wall 86, forward of the wall 82, and a curved wall 87, together with a part of the bottom wall of the hull to which said walls 86 and 87 are joined at their lower edges. In the wall 82 between the propeller chamber and the air chamber 85 is formed an opening 88 provided with a removable air-tight closure or cover 89 and in the forward wall 86 of said air chamber is provided an opening 90 provided with a like removable cover 91. Two air pipes 92, 92, supplied with air under pressure from a suitable pump or blower (not shown), are arranged to deliver air to the two longitudinal air ducts 93, 93, by which air is supplied beneath the hydroplane surfaces of the boat, as hereinbefore described. In this instance, two parallel, longitudinal air ducts 93, 93, are formed by a horizontal wall 93$^a$ and a central vertical wall 93$^b$. Branch supply pipes 92$^a$ are arranged to supply air from the pipes 92 to the air locks 85, and branch pipes 92$^b$ are arranged to supply air from said pipes 92 to the top of each propeller chamber. The pipes 92$^a$ are provided with valves 92$^c$. The construction described, embracing an air chamber 85 forming an air lock, is adapted to permit access to the interior of each propeller chamber and the propeller therein located, without removing the boat from the water, and even when the boat is under speed. Normally the valves 92ᶜ will be closed and there will be no pressure in the air locks 85, so that the latter may be entered by the operator through the openings 90 therein. When, however, it is desired to gain access to one of the propeller chambers, the operator enters the air lock and closes the opening 90 by the cover 91. The valve 92ᵃ is then opened to admit the air under pressure to said air lock. The cover 89 may then be removed and both the propeller chamber and air chamber being under the same air pressure, access may be had through the opening 88 to the propeller chamber. As shown in said Figs. 19 to 21, and in Figs. 19ᵃ and 19ᵇ, a construction is provided in the sides of the hull, especially adapted for use on large boats, which have a large area of the hull immersed, even at high speeds, as follows: The side walls of the hull are provided, below the water line and between the said water line and the bilge line, with a series of rearwardly facing shoulders 94, and between said shoulders 94ᵃ, which are inclined (Fig. 19ᵃ) outwardly and rearwardly from the inner margin of each shoulder to the outer margin of the one at the rear of the same. Said shoulders, with the inclined faces connecting them, serve in the rapid forward movement of the boat, to lessen the area of contact between the water and the sides of the hull and to thereby lessen the frictional resistance to the forward movement of the boat. This result arises from the fact that, when the boat is at speed, air spaces will be left at the rear of said shoulders, and the water will come in contact with the rear portion only of each of said surfaces. When air is constantly supplied, under pressure, beneath the bottom of the boat, as hereinbefore described, the surplus air will escape in part, or to some extent, at the bilge line, and the air thus escaping will rise through the spaces or channels behind the shoulders 94, and by increasing the air pressure in said spaces, will tend to decrease the area of each surface in contact with the water. The surfaces 94ᵃ are shown as provided with horizontally disposed, outwardly extending ribs 94ᵇ, which act to prevent the upward escape of air from the spaces below said ribs, if the upper ends of the shoulders are carried above the surface of the water by the rolling of the boat.

Important advantages are gained by the use of the horizontal, longitudinally extending ribs 94ᵇ, arranged intermediate the upper and lower ends of the shoulders 94, which will be understood from the following: The air discharged from the outer margins of the hydroplane surfaces and rising at the sides of the hull, will be confined in the spaces at the rear of the shoulders 94, 94 by reason of the fact that such spaces are closed at their upper ends by contact of the water with the continuous surface of the hull between the upper ends of the shoulder 94 and the water line. In the absence of the longitudinal ribs 94ᵇ, if in the lateral rolling of the boat the upper ends of the said shoulders should be carried above the water line, air would freely escape from the spaces at the rear of said shoulders, but when said longitudinal ribs 94ᵇ are employed, the air in spaces above said ribs only would escape under the circumstances mentioned, while the air in the spaces below said ribs would still be held or confined therein, so long as the rolling movement of the boat were not sufficient in extent to carry said ribs above the surface of the water. In other words, by the employment of said ribs 94ᵇ, the action of the shoulders 94 and air spaces thereby formed will serve to lessen to a material degree the lateral area of the surface of the hull in frictional contact with the water, notwithstanding a considerable rolling motion of the boat such as would permit the escape of the air from the upper parts of such spaces.

In Figs. 22 to 24 is shown a construction embracing downwardly facing surfaces acting in connection with a propeller or propellers, in the same manner as hereinbefore described. In this instance, two propellers are located at the rear of the stern of the boat. Two metal plates 95, 95, are rigidly attached to and extend rearwardly from the rear wall of the hull, said plates having a cross-sectional form corresponding with that of the bottom of the hull in advance of the same. The plates 95, 95 are arranged to constitute the bottom walls of sheet metal casings 96, 96, which surround the propellers and form two propeller chambers 97, 97. Said plates 95, 95 are provided with transversely extending openings through which the propeller blades extend and act to hold the water from rising at the sides of and behind the propeller, as hereinbefore described.

As shown in the drawings, Fig. 19, the propeller shaft 34 passes through the transverse partition 82 (corresponding with the partition 75 of Fig. 3), constituting the forward wall of the propeller chamber, and a suitable bearing is provided on said partition for the shaft.

It will be understood that in the operation of a hydroplane boat provided with hydroplane surfaces, the water line of the hull will be variable and the forward hydroplaning surfaces will be immersed to a greater or less extent, according to the speed of the boat and under varying conditions as to roughness or unevenness of the surface of the water. It follows that when provision is made for introducing air under pressure beneath said hydroplane surfaces, as hereinbefore described, such air can be constantly confined under the hydroplane surfaces at the rear and middle portions of the hull, which hydroplane surfaces carry the principal part of the weight of the craft and are constantly immersed, but the air pressure cannot be maintained regularly under the hydroplane surfaces adjacent to the bow of the boat. In order to meet these conditions in the operation of the boat, the forward hydroplane surfaces to which air is delivered are located at a considerable distance rearwardly from the bow of the boat, and the air is discharged near the keel line, or part of the bottom which is less liable to rise above the surface of the water when high waves are encountered. In other words, air will be introduced only under the hydroplane members which will be usually or ordinarily immersed, or in contact with the surface of the water, so that there will be little or no free escape of air from the openings through which the air is discharged beneath the hydroplane surfaces. It is not essential, however, that each forward hydroplane surface beneath which air is thus introduced should be constantly immersed, because the occasional lifting of such hydroplane member above the surface of the water, and consequent escape of a quantity of air, will have no material effect so far as is concerned the action of the air which is constantly supplied under pressure beneath the other hydroplane surfaces at the middle and rear portion of the hull. It is to be further noted, in the case of boats of considerable length, such, for example, as torpedo boats or destroyers, that the actual degree of lifting of the stern portion of the boat, by reason of the action of the hydroplane surfaces, may be very slight, but the introduction of air under pressure beneath said surfaces, as hereinbefore described, will in such cases afford greatly decreased resistance to the forward movement of the boat, by reason of decrease of area subject to water friction, even though the submerged area of the hull be not greatly decreased by the lifting effect of the hydroplane surfaces.

In the case of larger boats which are not lifted to a material extent by the action of the hydroplane surfaces, a considerable portion of the side walls of the hull will be always immersed, and in order to lessen the water friction at the immersed portions of the sides of the hull, I provide between the water line and the bilge line, laterally facing planes having shallow steps, such as are illustrated in Figs. 19, 20 and 21; such shallow steps, as hereinbefore described, affording a slight angle of the hydroplane surfaces on the sides of the boat, so that while the area of the sides of the hull in frictional contact with the water will be decreased in the rapid forward movement of the boat, the angle of the inclined surfaces will not be sufficient to afford any material resistance to such forward movement.

The pipe or passage supplying air beneath the hydroplane surfaces will usually be provided with outwardly opening check valves, shown in the drawings in the form of the check valves 32, at the outlet from the crank case 30$^b$. When such check valves are made in the form shown in the drawings, or otherwise, such valves will prevent the water entering the boat when the air forcing devices are not in operation. Additional manually operable valves may be provided in such pipe or passage, for safety, if desired.

With respect to the employment of a downwardly opening well or propeller chamber, in connection with downwardly facing surfaces at the rear and sides of the propeller, arranged to prevent the water from escaping too rapidly under the impact or action of the propeller blades, I have, in the illustration of the accompanying drawings, so constructed each of these surfaces that it forms one of the hydroplane surfaces of the boat. This construction has the adavantage that the water pressure caused by the action of the propeller blades in tending to throw the water rearwardly and upwardly, to some extent aids in lifting the boat, but so far as is concerned the action of said downwardly facing surfaces in keeping the water from rising at the rear of the propeller, and insuring that the propeller blades shall always act in a solid body of water, it is not necessary that the said surfaces should be so inclined or should constitute hydroplane surfaces.

The location of the propeller in a well or propeller chamber, located forward of the stern of the boat, has the important advantage when a single propeller is used, that the lateral pull of the propeller is to a large extent counteracted by the side pressure on the water of the immersed portion of the hull at the rear of the propeller, especially when such rear portion of the hull is of V-shape in cross-section, or provided with a downwardly projecting, longitudinal part or keel, thereby making it unnecessary to employ the rudder as a means for preventing the stern of the boat from swinging laterally under such lateral pull of the propeller. Moreover, by the employment of a propeller chamber or well arranged in the hull of the boat, as in the construction shown in Fig. 19, the propeller can be placed at such distance forward of the stern of the boat that the lateral pressure on the water of the rear part of the hull whether made of V-shape or not, will counteract all of the side pull of the propeller tending to change the course of the vessel; it being understood that, where a single propeller is located at the stern of the boat or near the same, such side pull of the propeller must necessarily be counteracted by the rudder and the holding of the rudder at an angle to the center line of the boat for that purpose will result in increased resistance and waste of power. The location of the propeller in the hull of the boat forward of its stern also has the advantage that the hydroplane surfaces of the hull may be used to confine the water from rising behind or around the propeller blades, without the necessity of attaching to the stern of the boat special parts for this purpose, as in the construction shown in Figs. 22 to 24. It is to be understood, however, that the employment of a hydroplane surface or surfaces at the rear of the propeller affords important advantages in either form of construction referred to, for the reason that, as the water acted upon by the propeller is driven backward, and as the speed of the boat is greater with relation to the water so driven backward than with relation to the surrounding water, the lifting power of the hydroplane surfaces at the rear of the propeller will be increased by the backward moving water acting on such hydroplane surface as well as by the upward pressure of such backwardly moving water which is put in motion in an upward as well as a rearward direction by the action of the propeller.

The general advantages gained by employment of a propeller, the hub of which is above the level of the water in which the propeller blades operate, are that the draft of the boat as a whole is decreased and a lessened resistance obtains, because of the shaft and hub being out of water. The location of the hub of the propeller above the level of the water in which the blades operate, has the further important advantage of enabling reversible blades to be used without materially affecting the efficiency of the propeller in producing either forward or backward movement of the boat. This will be understood from consideration of the fact that when submerged reversible propellers are employed, if the propeller blades be so designed as to give maximum effect in one position, they will be much less efficient in other positions, while the parts of the blades adjacent to the hub afford a large degree of resistance to the rotation of the propeller, without exerting any material backward pressure or thrust on the water. For these reasons such submerged reversible propellers have been found to have small efficiency and have not been used where high speeds are desired. It is to be further observed that employment of downwardly opening propeller chambers or wells, arranged as shown, makes it possible to locate the propellers in the most desirable position, that is to say, where the blades will not be thrown out of water in rough water, while at the same time any desired number of propellers may be used on a single boat and the motors or engines may be located close to each propeller and connected therewith by shafts of short length.

It is to be understood that the drawings illustrate what I now deem to be a desirable and practical form of the several features constituting my invention, but that the forms of such features may be variously modified without departure from the spirit of the invention.

I claim as my invention:

1. A hydroplane boat provided at each side of the center line of its bottom with a hydroplane surface which is inclined from the side wall of the hull downwardly and inwardly toward the said center or keel line, and with a transverse, rearwardly facing shoulder located in advance of the said hydroplane surface, and forming with said hydroplane surface a transversely extending air space or channel, and also provided on the submerged parts of the sides of its hull with longitudinally continuous surfaces adapted to prevent the escape of air from the said air spaces or channels and air forcing means acting to deliver air under pressure to said air spaces or channels and adapted to therein maintain bodies of air under a pressure not less than the pressure exerted by the water against said bodies of air.

2. A hydroplane boat provided at opposite sides of its center or keel line with a plurality of hydroplane surfaces which are inclined from the side walls of the hull downwardly and inwardly toward said center or keel line and with transverse shoulders severally located in advance of said hydroplane surfaces, and forming with said hydroplane surfaces transversely extending air spaces or channels, and also provided on the sides of its hull with longitudinally continuous surfaces extending across the outer ends of said air spaces or channels.

3. A hydroplane boat provided at each side of its center or keel line with a plurality of hydroplane surfaces which are inclined from the sides of the hull downwardly toward the center or keel line thereof, and with transversely extending shoulders severally located forward of the hydroplane surfaces and forming therewith transversely extending air spaces or channels and also provided on the submerged parts of the sides of its hull with longitudinally continuous surfaces extending across the outer ends of said channels, a longitudinal air duct adapted to deliver air to said air spaces or channels, and air forcing means acting to deliver air under pressure to said air duct.

4. A hydroplane boat provided at each side of its center or keel line with a plurality of hydroplane surfaces which are inclined from the sides of the hull downwardly toward the center or keel line thereof, and with a plurality of shoulders severally located in advance of said hydroplane surfaces and forming therewith transversely extending air spaces or channels, and also provided on the submerged parts of the sides of its hull with longitudinally continuous surfaces extending across the outer ends of said air spaces or channels, and an air duct extending along said center or keel line and adapted to deliver air to the inner ends of said air spaces or channels, and air forcing means acting to deliver air under pressure to said air duct.

5. A hydroplane boat provided at each side of its center or keel line with a plurality of hydroplane surfaces, and with a plurality of transverse, rearwardly facing shoulders, severally located in advance of said hydroplane surfaces, and forming with the latter transversely extending air spaces or channels, an air duct exterior to the bottom of the hull, extending longitudinally thereof along the center line of the same and adapted to deliver air to the inner ends of said air spaces or channels, and air forcing means adapted to deliver air under pressure to said air duct.

6. A hydroplane boat provided at each side of its center or keel line with a plurality of hydroplane surfaces, and with a plurality of transverse, rearwardly facing shoulders, severally located in advance of said hydroplane surfaces, and forming with the latter transversely extending air spaces or channels, and also provided on the submerged parts of the side walls of the hull with longitudinally continuous surfaces extending across the outer ends of said air spaces or channels, an air duct exterior to the bottom of the hull, extending longitudinally thereof along the center line of the same and adapted to deliver air to the inner ends of said air spaces or channels, and air forcing means adapted to deliver air under pressure to said air duct 7. A hydroplane boat provided at each side of its center or keel line with a plurality of hydroplane surfaces which are inclined laterally from the sides of the hull downwardly toward the center or keel line thereof, and with a plurality of transverse, rearwardly facing shoulders, severally located in advance of said hydroplane surfaces, and forming with the latter transversely extending air spaces or channels, an air duct exterior to the bottom of the hull, extending longitudinally thereof along the center line of the same and adapted to deliver air to the inner ends of said air spaces or channels, and air forcing means adapted to deliver air under pressure to said air duct.

8. A hydroplane boat provided at each side of its center or keel line with a plurality of hydroplane surfaces which are inclined laterally from the sides of the hull downwardly toward the center or keel line thereof, and with a plurality of transverse, rearwardly facing shoulders, severally located in advance of said hydroplane surfaces, and forming with the latter transversely extending air spaces or channels, and also provided on the submerged parts of the side walls of the hull with longitudinally continuous surfaces extending across the outer ends of said air spaces or channels, an air duct exterior to the bottom of the hull, extending longitudinally thereof along the center line of the same and adapted to deliver air to the inner ends of said air spaces or channels, and air forcing means adapted to deliver air under pressure to said air duct.

9. A hydroplane boat provided at each side of its keel line with a plurality of hydroplane surfaces, and with a plurality of transversely extending, rearwardly facing shoulders located severally in advance of said hydroplane surfaces and forming therewith a plurality of transversely extending air spaces or channels, an air duct exterior to the bottom of the hull extending longitudinally thereof along the center line of the same and open at its rear end through the stern of the boat, and air forcing means acting to deliver air under pressure to the forward end of said air duct.

10. A hydroplane boat provided at each side of its keel line with a plurality of hydroplane surfaces which are inclined laterally from the sides of the hull downwardly toward the center or keel line thereof, and with a plurality of transversely extending, rearwardly facing shoulders located severally in advance of said hydroplane surfaces and forming therewith a plurality of transversely extending air spaces or channels, an air duct exterior to the bottom of the hull extending longitudinally thereof along the center line of the same and open at its rear end through the stern of the boat, and air forcing means acting to deliver air under pressure to the forward end of said air duct.

11. A hydroplane boat provided at the opposite sides of its center or keel line with hydroplane surfaces which are inclined laterally from the sides of the hull downwardly and inwardly toward its center or keel line and with a plurality of transversely extending, rearwardly facing shoulders severally located in advance of said hydroplane surfaces and forming therewith transversely extending air spaces or channels, said boat having at the lower margins of the sides of its hull continuous, longitudinal bilge members, the lower margins of which extend across the outer ends of said air spaces or channels.

12. A hydroplane boat provided at the opposite sides of its center or keel line with hydroplane surfaces which are inclined laterally from the sides of the hull downwardly and inwardly toward its center or keel line and with a plurality of transversely extending, rearwardly facing shoulders severally located in advance of said hydroplane surfaces and forming therewith transversely extending air spaces or channels, said boat having at the lower margins of the sides of its hull continuous, longitudinal bilge members, the lower margins of which extend across the outer ends of said air spaces or channels, and air forcing means acting to deliver air under pressure to said air spaces or channels.

13. A boat, comprising a hull provided on each side thereof below the water level with a continuous and unbroken, longitudinal bilge line, said hull extending below said bilge lines and provided below said bilge lines with a plurality of rearwardly facing, transverse shoulders, the ends of which terminate in said continuous bilge lines, and rearwardly and outwardly inclined surfaces severally located at the rear of said shoulders.

14. A hydroplane boat provided at each side of its center or keel line with a plurality of hydroplane surfaces and transverse, rearwardly facing shoulders located severally in advance of said hydroplane surfaces and forming therewith transverse air spaces or channels, and also provided on the sides of its hull with longitudinally continuous surfaces extending across the outer ends of said air spaces or channels, and above said longitudinally continuous surfaces and below the water line with a plurality of rearwardly facing shoulders and rearwardly and outwardly inclined surfaces severally located at the rear of said shoulders.

15. A hydroplane boat provided on the sides of its hull with a plurality of rearwardly facing shoulders and rearwardly and outwardly inclined surfaces at the rear of said shoulders, and also with outwardly projecting, longitudinally extending ribs extending across the channels formed by said shoulders and inclined surfaces.

16. A hydroplane boat provided at each side of its center or keel line with a hydroplane surface and with a transverse, rearwardly facing shoulder located at a distance in advance of the forward transverse margin of said hydroplane surface, the said transverse shoulder and hydroplane surface together with the downwardly facing surface of the hull between the same constituting a transversely extending air space or channel.

In testimony, that I, claim the foregoing as my invention I affix my signature in the presence of two witnesses, this 18th day of November, A. D. 1912.

WILLIAM H. FAUBER.

Witnesses:
EUGENE C. WANN,
M. F. ANTHONY.